(12) United States Patent
Hamrin et al.

(10) Patent No.: US 11,592,094 B2
(45) Date of Patent: Feb. 28, 2023

(54) DIFFERENTIAL HAVING AN OVERRUNNING CLUTCH WITH INERTIAL COMPENSATION TUNING

(71) Applicant: TEAM Industries, Inc., Bagley, MN (US)

(72) Inventors: John Edward Hamrin, Bemidji, MN (US); Jordan Murphy, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 17/399,334

(22) Filed: Aug. 11, 2021

(65) Prior Publication Data

US 2022/0381328 A1 Dec. 1, 2022

Related U.S. Application Data

(60) Provisional application No. 63/194,781, filed on May 28, 2021.

(51) Int. Cl.
*F16H 48/12* (2012.01)
*F16H 48/24* (2006.01)
(Continued)

(52) U.S. Cl.
CPC .............. *F16H 48/24* (2013.01); *F16H 48/10* (2013.01); *F16H 48/30* (2013.01); *F16H 48/12* (2013.01); *F16H 2048/202* (2013.01)

(58) Field of Classification Search
CPC .......... F16H 48/24; F16H 48/10; F16H 48/30; F16H 2048/202; F16H 48/12; F16H 48/14; F16H 48/16; F16D 41/067
See application file for complete search history.

(56) References Cited

U.S. PATENT DOCUMENTS

| 1,823,389 A | 9/1931 | De |
| 1,902,449 A * | 3/1933 | Hughes .................. F16H 48/30 74/650 |

(Continued)

FOREIGN PATENT DOCUMENTS

| CA | 2904602 C | 2/2018 |
| DE | 430321 C | 6/1926 |

(Continued)

OTHER PUBLICATIONS

"Auto Locking Front Drive System (Differential) for On-Demand Four Wheel Drive", at least as early as Feb. 9, 2019, p. 1.
(Continued)

*Primary Examiner* — Sherry L Estremsky
(74) *Attorney, Agent, or Firm* — Fogg & Powers LLC

(57) ABSTRACT

A differential having an overrunning clutch provided. The differential includes an inertial compensation assembly that is configured to counteract movement of a roller cage relative to a clutch cam housing to prevent unintended roller cage and clutch cam housing engagements. Unintended roller cage and clutch cam housing engagements may occur when the differential is subject to rotational accelerations caused, for example by, vehicle acceleration/deceleration, sudden braking, sudden changes in traction, road irregularities, bumps, jumps, u-joint phasing, etc.

20 Claims, 17 Drawing Sheets

(51) Int. Cl.
*F16H 48/30* (2012.01)
*F16H 48/10* (2012.01)
*F16H 48/20* (2012.01)

(56) References Cited

U.S. PATENT DOCUMENTS

| | | | |
|---|---|---|---|
| 3,055,471 | A | 9/1962 | Warn et al. |
| 3,283,611 | A * | 11/1966 | Weismann ............... F16H 48/16 |
| | | | 74/650 |
| 3,300,002 | A | 1/1967 | Roper |
| 3,344,686 | A | 10/1967 | Baker |
| 3,447,396 | A | 6/1969 | Seliger |
| 3,700,082 | A | 10/1972 | Schwab |
| 3,788,435 | A | 1/1974 | Prueter |
| 4,044,870 | A * | 8/1977 | Fogelberg ............. F16D 41/067 |
| | | | 192/106 R |
| 4,124,085 | A | 11/1978 | Fogelberg |
| 5,025,902 | A | 6/1991 | Imai et al. |
| 5,036,939 | A | 8/1991 | Johnson et al. |
| 5,971,123 | A | 10/1999 | Ochab et al. |
| 6,132,332 | A | 10/2000 | Yasui |
| RE38,012 | E | 3/2003 | Ochab et al. |
| 6,557,677 | B2 | 5/2003 | Peura |
| 6,595,337 | B2 * | 7/2003 | Goto ........................ F16D 41/04 |
| | | | 192/84.8 |
| 6,629,590 | B2 | 10/2003 | Ochab et al. |
| 6,722,484 | B2 | 4/2004 | Ochab et al. |
| 7,410,042 | B2 | 8/2008 | Ochab et al. |
| 7,490,708 | B2 | 2/2009 | Irikura et al. |
| 7,493,998 | B2 | 2/2009 | Irikura et al. |
| 7,559,390 | B2 | 7/2009 | Marsh et al. |
| 7,690,469 | B2 | 4/2010 | Irikura et al. |
| 7,938,041 | B1 | 5/2011 | Shiigi et al. |
| 8,312,792 | B1 | 11/2012 | Kochidomari et al. |
| 8,365,636 | B2 | 2/2013 | Irikura et al. |
| 8,840,514 | B1 * | 9/2014 | Knickerbocker ...... B60K 17/26 |
| | | | 475/220 |
| 8,857,294 | B2 | 10/2014 | Brewer et al. |
| 9,022,195 | B2 | 5/2015 | Heath et al. |
| 9,033,851 | B2 * | 5/2015 | Itakura .................... F16D 21/04 |
| | | | 477/107 |
| 9,272,620 | B2 | 3/2016 | Knickerbocker et al. |
| 9,719,567 | B2 | 8/2017 | Lawrence et al. |
| 9,856,930 | B2 | 1/2018 | Heath et al. |
| 10,150,369 | B2 | 12/2018 | Thornton et al. |
| 10,337,570 | B2 * | 7/2019 | Tsukamoto ........... F16D 41/105 |
| 11,047,464 | B2 | 6/2021 | Hamrin et al. |
| 2002/0125095 | A1 | 9/2002 | Ochab et al. |
| 2002/0125097 | A1 | 9/2002 | Ochab et al. |
| 2003/0000796 | A1 | 1/2003 | Kawai et al. |
| 2006/0254382 | A1 | 11/2006 | Ebihara |
| 2007/0170029 | A1 | 7/2007 | Okada et al. |
| 2007/0286743 | A1 | 12/2007 | Ochab et al. |
| 2013/0112520 | A1 | 5/2013 | Heath et al. |
| 2013/0134006 | A1 | 5/2013 | Heath et al. |
| 2013/0199886 | A1 | 8/2013 | Heath et al. |
| 2014/0038763 | A1 | 2/2014 | Knickerbocker et al. |
| 2014/0274530 | A1 | 9/2014 | Knickerbocker et al. |
| 2015/0159743 | A1 | 6/2015 | Palmer et al. |
| 2017/0108059 | A1 | 4/2017 | Tsukamoto et al. |
| 2017/0210226 | A1 | 7/2017 | Thornton et al. |
| 2017/0268584 | A1 | 9/2017 | Heath et al. |
| 2018/0283472 | A1 | 10/2018 | Fukuda |

FOREIGN PATENT DOCUMENTS

| | | |
|---|---|---|
| EP | 1707837 A1 | 10/2006 |
| EP | 1350657 B1 | 2/2007 |
| EP | 2971830 B1 | 7/2018 |
| GB | 2252801 A | 8/1992 |
| JP | S5986748 A | 5/1984 |
| WO | 2002040891 A2 | 5/2002 |
| WO | 2014143090 A1 | 9/2014 |

OTHER PUBLICATIONS

Hilliard, "ATV/UTV", Hilliard Motion Control Division, at least as early as Jan. 2, 2020, pp. 1-7, Hilliard Corporation.

Hilliard, "Gen III Front Drive System Differential Gearcase P/N 6203-01-256 Parts and Service Manual", Rev. 0, Nov. 12, 2007, pp. 1-6, Hilliard.

International Searching Authority, "International Search Report and Written Opinion from PCT Application No. PCT/US2020/018659", from Foreign Counterpart to U.S. Appl. No. 16/793,849, dated Jun. 5, 2020, pp. 1 through 18, Published: WO.

U.S. Patent and Trademark Office, "Notice of Allowance", U.S. Appl. No. 16/793,849, dated Mar. 10, 2021, pp. 1 through 7, Published: US.

U.S. Patent and Trademark Office, "Office Action", U.S. Appl. No. 16/793,849, dated Dec. 23, 2020, pp. 1 through 20, Published: US.

* cited by examiner

DIFFERENTIAL HAVING AN OVERRUNNING CLUTCH WITH INERTIAL COMPENSATION TUNING

CROSS-REFERENCE TO RELATED APPLICATIONS

This Application claims priority to U.S. Provisional Application Ser. No. 63/194,781, entitled "Overrunning Clutch Front Differential with Inertia Compensation Tuning", filed on May 28, 2021, which is incorporated in its entirety herein by reference.

BACKGROUND

Vehicle differentials transfer torque between a driveshaft and driven shafts (or half shafts). A differential allows the half shafts to rotate at different rotational speeds with relation to each other when a vehicle turns to prevent tire scrubbing, reduce transmission loads, and reduce understeering during cornering (the tendency of the vehicle to go straight in a corner). In four-wheel drive applications, bi-directional overrunning clutches (ORC) have been employed in differentials to transmit torque to the wheel via the half shafts when needed. For example, in a front differential example, the front differential is designed to transfer torque when the rear wheels are rotating faster than the front wheels.

Vehicle wheel and driveline speeds are not constant (i.e. rotational accelerations are always present). The rotational acceleration can be positive or negative. Causes of the accelerations include vehicle acceleration/deceleration, sudden braking, sudden changes in traction, road irregularities, bumps, jumps, u-joint phasing, etc. Over-running clutch designs typically incorporate a roller cage. A roller cage has different modes of operation. A rotational position of the roller cage relative to a clutch cam housing determines the operating mode of the drive.

If the cage is retarded from its neutral position, the drive operates as an over-running clutch (ORC mode). If the cage is in its neutral position, the drive is fully disengaged. If the cage is advanced, the drive operates as an under-running clutch. If inertial torque of the roller assembly etc. is greater than the neutral mode maintaining roller centering spring, an unintended operating mode will result. This unintended operation mode may cause sudden engagements, driveline shock and unintended vehicle dynamics. Hence, it is desired to prevent inertial engagements of an unintended operating mode.

SUMMARY OF INVENTION

The following summary is made by way of example and not by way of limitation. It is merely provided to aid the reader in understanding some of the aspects of the subject matter described. Embodiments provide a differential having an overrunning clutch with inertial compensation tuning that prevents unintended inertial engagements between a roller cage and clutch cam housing of the overrunning clutch.

In one embodiment a differential having an overrunning clutch (ORC) is provided. The differential includes a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally engaged with the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engaging a first set of the plurality of rollers. The first hub configured to be in operational communication with a first half shaft. The second hub is at least in part received within a second portion of the roller cage. A portion of the second hub engages a second set of the plurality of rollers. The second hub configured to be in operational communication with a second half shaft. The inertial compensation assembly is configured to counteract inertial movement of the roller cage relative to the clutch cam housing to prevent unintended roller cage and clutch cam housing engagements.

In another embodiment, a differential having an overrunning clutch (ORC) is provided. The differential includes a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear operationally engaged with the pinion. The clutch cam housing operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally engaged with the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The inertial compensation assembly includes planetary gear trains configured to counteract inertial movement of the roller cage relative to the clutch cam housing to prevent unintended roller cage and clutch cam housing engagements.

In still another embodiment, a vehicle is provided. The vehicle includes a plurality of wheels, a motor to generate engine torque, a transmission in operational communication with the motor and the wheels and differential. The differential has an overrunning clutch (ORC). The differential is positioned between at least one wheel and the transmission. The differential including a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The inertial compensation assembly is configured to counteract inertial movement of the roller cage in relation to the clutch cam housing to prevent unintended roller cage and clutch cam housing engagements.

BRIEF DESCRIPTION OF THE DRAWINGS

The present invention can be more easily understood and further advantages and uses thereof will be more readily apparent, when considered in view of the detailed description and the following figures in which.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a differential having an overrunning clutch with inertial compensation tuning that prevents unintended inertial engagements between a roller cage and clutch cam housing of the overrunning clutch.

Figure 1:
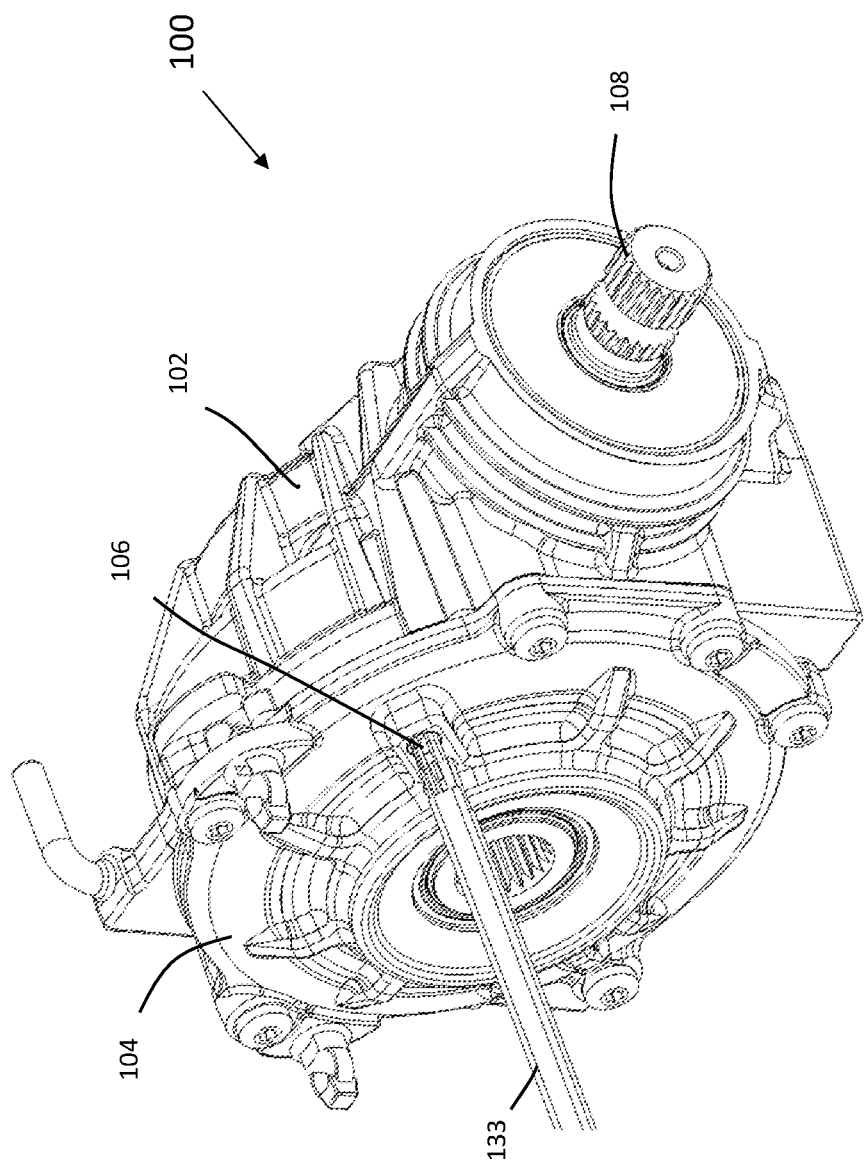
FIG. 1 is a side perspective view of an assembled differential that includes an overrunning clutch with inertial compensation tuning according to one exemplary embodiment.
Figure 2:
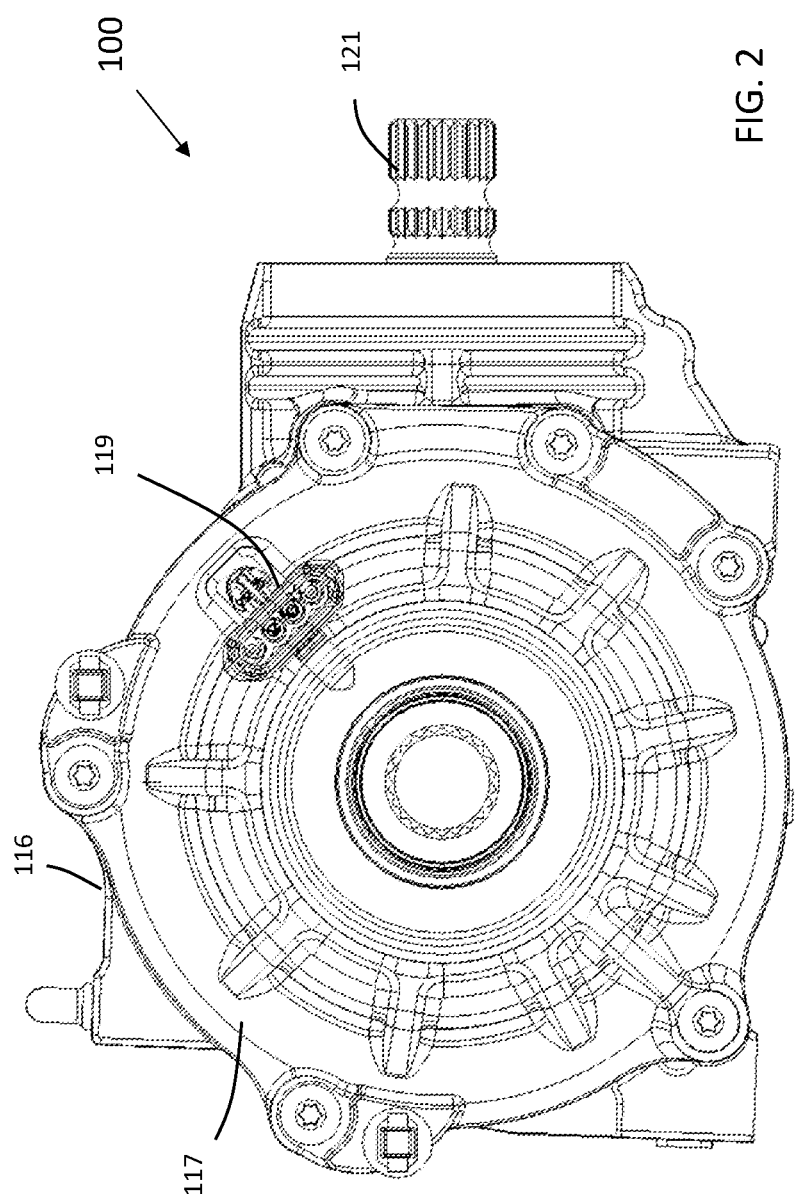
FIG. 2 is a side view of the assembled differential of FIG. 1.

Referring to FIGS. 1 and 2, a side perspective view and a side view of a differential 100 that includes an overrunning clutch with inertial compensation tuning of an example embodiment is illustrated. In this example, the differential 100 is a front differential. However, embodiments of the overrunning clutch with inertial compensation tuning may be applied to any type of differential system. As illustrated, in FIG. 1, the differential 100 includes a housing 102 (or case) and a cover 104. An activation input cable 133 used to selectively activate an overrunning clutch (ORC) electromagnet coil is communicative coupled to an input interface 106 at the cover 104 in this example. Further illustrated in FIGS. 1 and 2 is a transmission input coupler 108 (pinion) that in one embodiment includes a pinion gear as discussed below. The pinion 108 is configured to couple torque between a transmission 304 (shown in FIG. 17) and the differential 100 via prop shaft 306 or the like.

Figure 3:
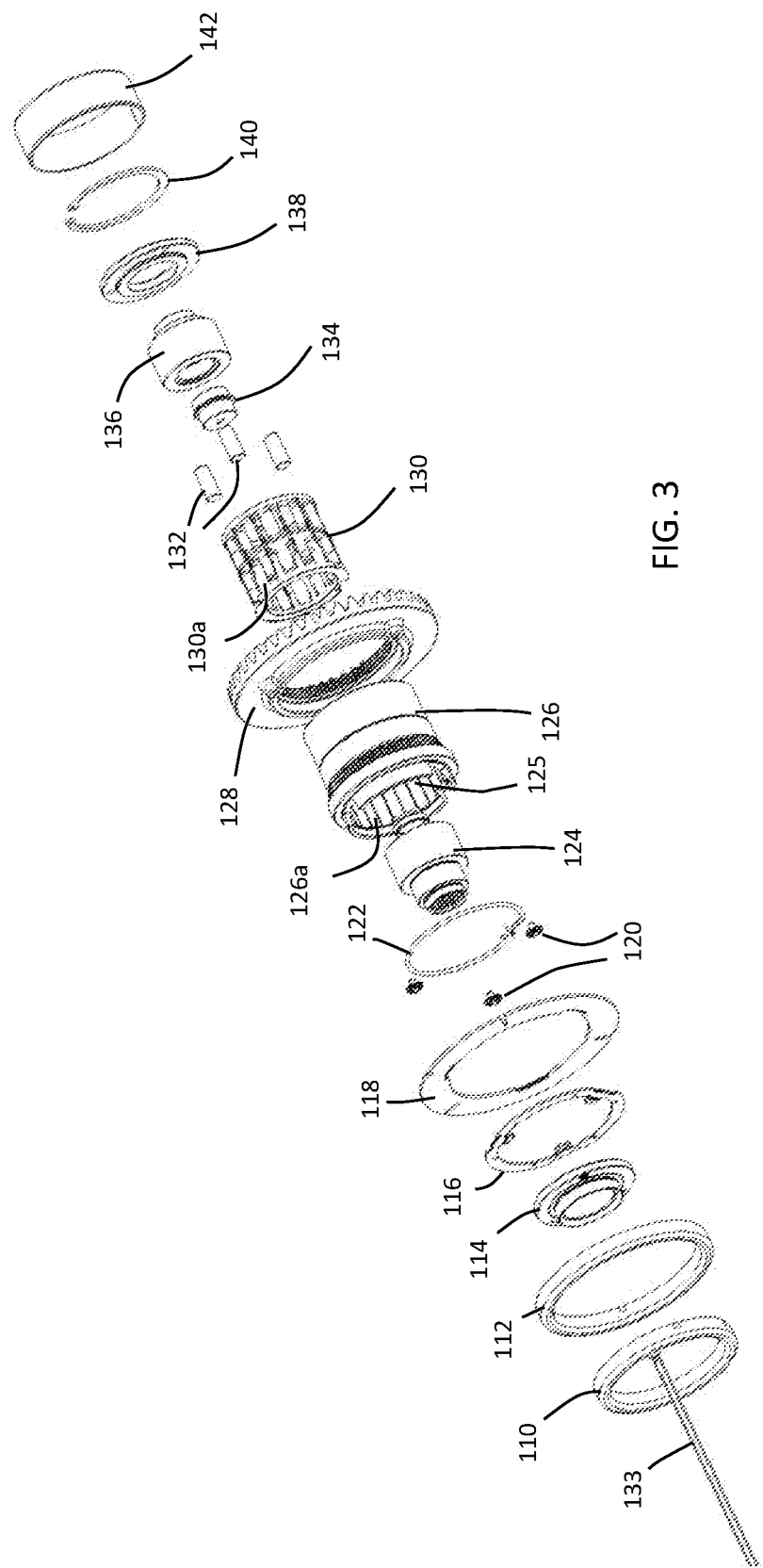
FIG. 3 is an unassembled side view of some components of the differential including the overrunning clutch according to one exemplary embodiment.

FIG. 3 illustrates an unassembled view of some of the components of the differential 100 that includes the ORC with inertial compensating tuning. As illustrated, the ORC with inertial compensating tuning includes an ORC electromagnetic coil 110 (ORC coil 110). The differential 100 may, in one example, also include a back-drive mode control (BDM) coil (back-drive coil) 112. Some embodiments do not include a BDM system. The ORC coil 110 is selectively activated to act on an ORC armature friction plate 116 (armature plate 116) and the BDM coil 112 is selectively activated to act on a flywheel friction plate 118 (flywheel plate 118), The differential 100 has an inertial compensation assembly 150 (best illustrated in FIG. 8) that includes the armature plate 116, the flywheel plate 118 and inertial coupling assemblies 155. The inertial assemblies include pivot gears 120 in this example embodiment. The inertial compensation assembly 150 provides an inertial communication between the armature plate 116 and the flywheel plate 118 to prevent unintended activation of the overrunning clutch as discussed below.

The overrunning clutch with inertial compensation tuning system of the differential 100 further includes a clutch cam housing 126. Engaged on an outer surface of the clutch cam housing 126 is a ring gear 128. In this example, internal splines of the ring gear 128 engage external splines on the clutch cam housing 126 to lock rotation of the clutch cam housing 126 with rotation of the ring gear 128. In another example, the clutch cam housing/ring gear are formed from one piece. The clutch cam housing 126 includes a central passage 125. Cam features 126a are formed within an interior surface defining the central passage. The overrunning clutch with inertial compensation tuning system further includes a retaining ring 140 and plain bearing 142.

The roller cage assembly 130 (or roller cage 130) is received within the clutch cam housing 126 such that each roller 132 held by the roller cage 130 is aligned with an associated cam feature 126a within the interior surface of the clutch cam housing 126. Received within the roller cage 130 are a first side hub 124, a second side hub 136 and a centering hub 134. The first side hub 124 and second side hub 136 are designed to couple torque between the hubs 124 and 136 and their associated half shaft 308a and 308b (illustrated in FIG. 17). The rollers 132 of the roller cage 130 engage an outer surface of the first and second side hubs 124 and 136. In particular, a first set of rollers 132 engage a portion of the first side hub 124 and a second set of rollers 132 engage a portion of the second side hub 136.

The rollers 132 in part, located by the roller cage 130, are operationally engaged with outer surfaces of the side hubs 124 and 136. In an example, a roller cage portion 130a of the roller cage 130 never directly touches the clutch cam housing 126 but is located in all degrees of freedom except rotation by the end caps 114 and 138 that are located by the clutch cam housing 126. When the system is engaged in ORC or back-drive mode, the rollers 132 are in direct contact with the clutch cam features of 126a of the clutch cam housing 126 and the side hubs 124 and 136 to transfer torque between the clutch cam housing 126 and the first and second side hubs 124 and 136.

The overrunning clutch with inertial compensation tuning system further includes a centering spring 122. The centering spring 122 engages the clutch cam housing 126 and the roller cage 130 to position the rollers 132 of the roller cage 130 in relation to the cam features 126a of the clutch cam housing 126 so torque is not transferred between the clutch cam housing 126 and the side hubs 124 and 136 during de-energized neutral operating conditions.

Figure 4:
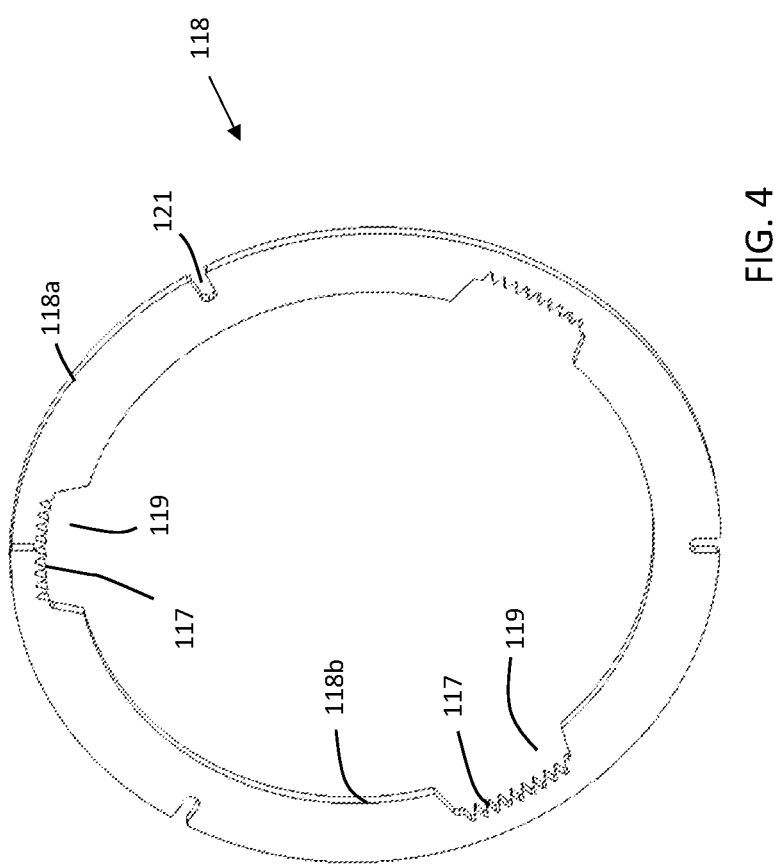
FIG. 4 is a side perspective view of an inertia flywheel plate according to one exemplary embodiment.

FIG. 4 illustrates a side perspective view of the flywheel plate 118. The flywheel plate 118 in this example includes spaced interior cutout sections 119 in an inner edge surface 118b. The inner edge surface 118b of the flywheel plate 118 defines an inner diameter of the flywheel plate 118. The interior cutout sections 119 provide windows to flywheel plate teeth 117 within each interior cutout section 119 that form a parallel axis involute spur sector gear. In this example there are three spaced axis involute spur sector gears. An outside edge surface 118a defines an outer diameter of the flywheel plate 118. The outside edge surface 118a includes spaced grooves 121 that are used to prevent excessive oil film thickness when operating in a back drive mode if equipped with a BDM coil.

Figure 5:
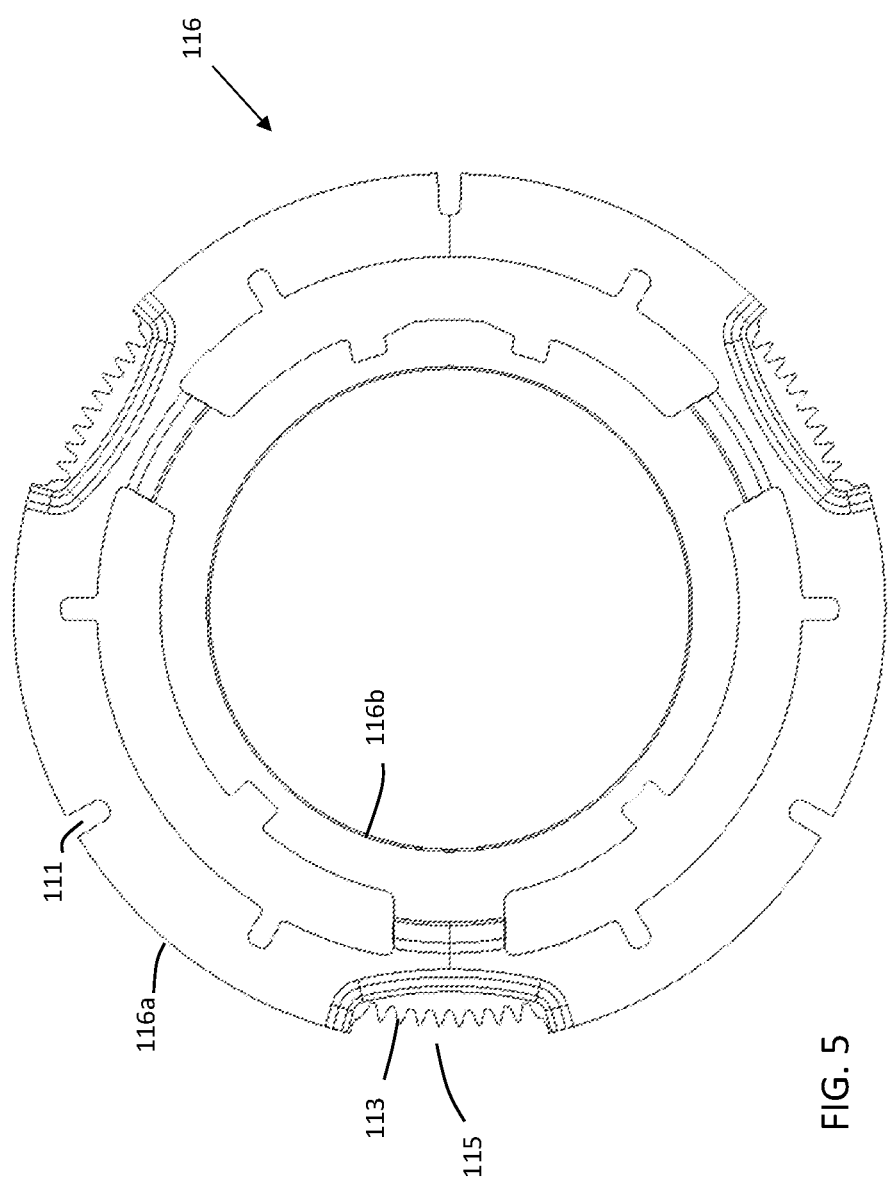
FIG. 5 is a side view of an overrunning clutch armature friction plate according to one exemplary embodiment.
Figure 6:
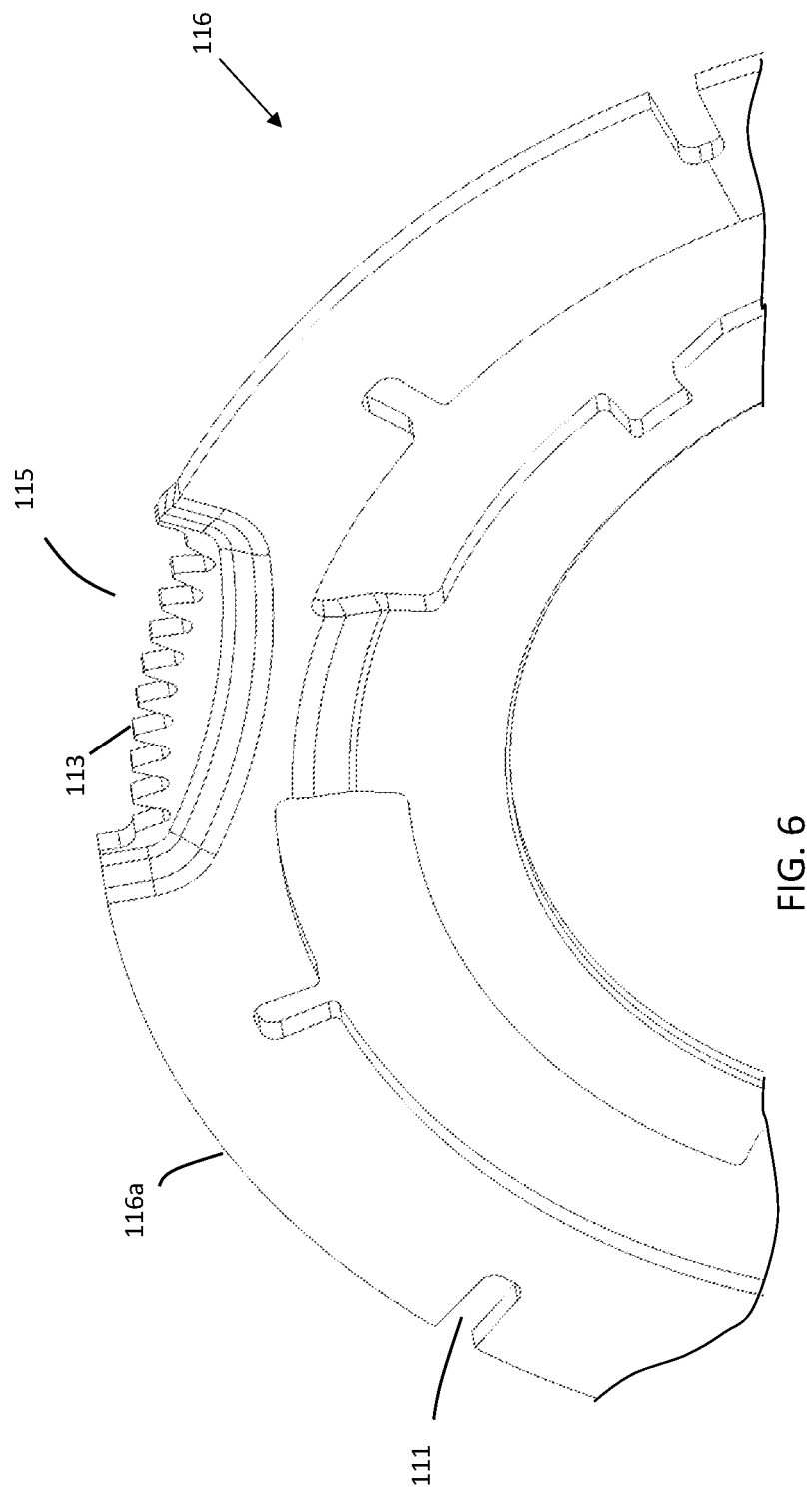
FIG. 6 is a partial side view of the overrunning clutch armature friction plate of FIG. 6.

An example of the armature plate 116 is provided in the side view of FIG. 5. The armature plate 116 includes an inner edge surface 116b that defines an inner diameter of the armature plate 116 and an outer edge surface 116a that defines an outer diameter of the armature plate 116. The outer edge surface 116a includes a plurality of outer cutout sections 115 that provide a plurality of spaced windows. The windows provide an opening to armature plate teeth 113 that form parallel axis involute spur sector gears. The outer edge surface 116a further includes spaced grooves 111. The spaced grooves 111 provide a scraping action to reduce oil film thickness during operation, providing a more consistent frictional torque across the range of operating rpms. A closeup partial view of the armature plate 116 is provided in FIG. 6.

Figure 7:
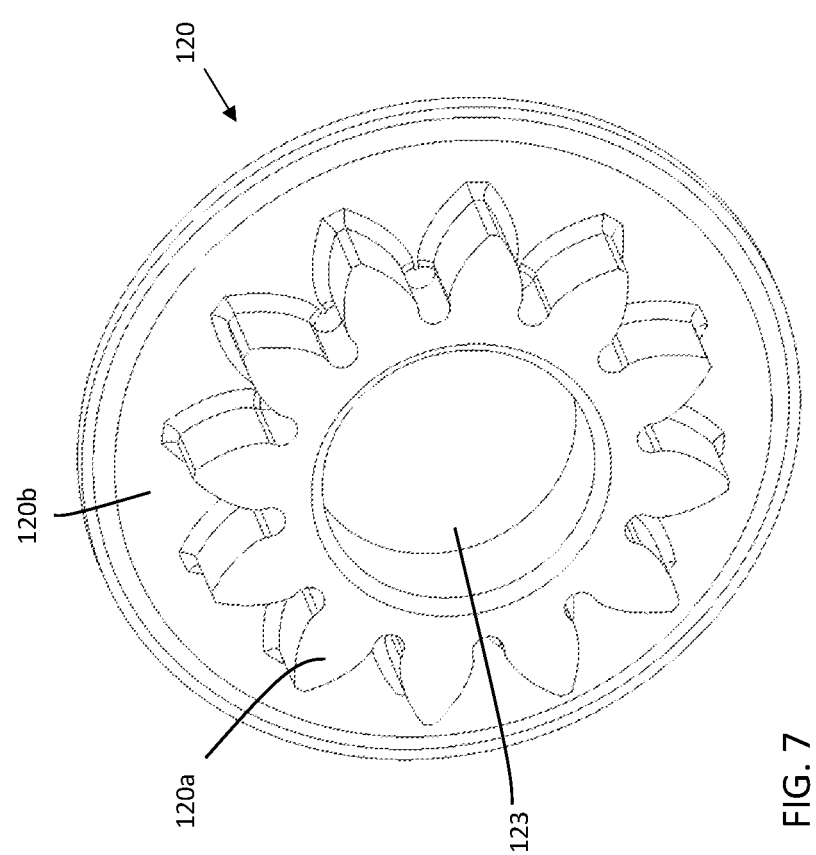
FIG. 7 is a side perspective view of a pivot gear according to one exemplary embodiment.

An example of the pivot gear 120 is illustrated in FIG. 7. The pivot gear 120 includes a parallel axis involute spur gear with pivot gear teeth 120a designed to engage the flywheel plate teeth 117 of the flywheel plate 118 and the armature plate teeth 113 of the armature plate 116. The pivot gear 120 further includes an axial retention feature 120b and a central opening 123. The parallel axis involute spur gear with pivot gear teeth 120a extends from the axial retention feature 120b around the central opening.

Figure 8:
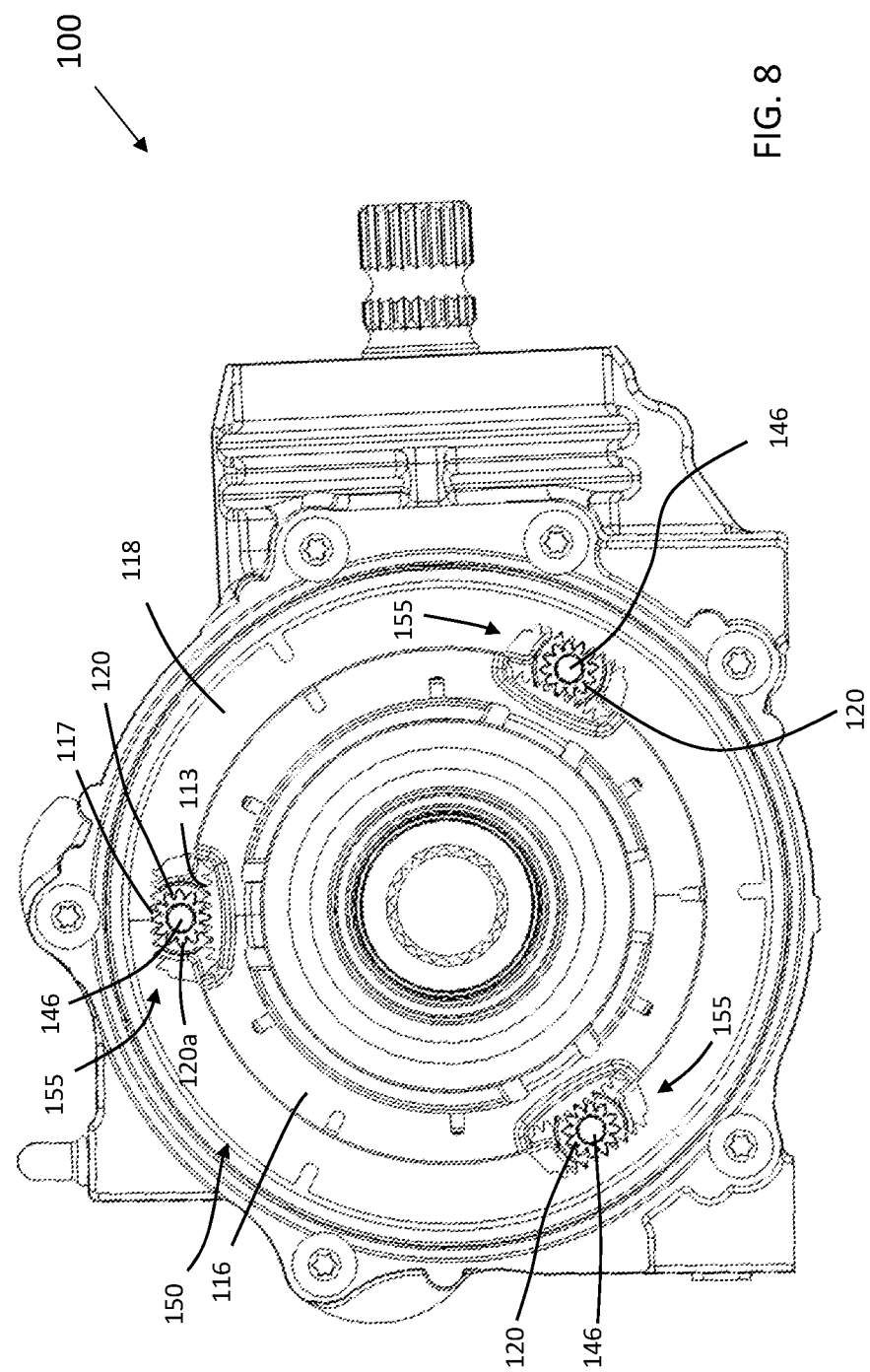
FIG. 8 is a side view of the assembled differential of FIG. 1 without a cover illustrating the inertial compensation tuning according to one exemplary embodiment.

Referring to FIG. 8, a side view of the differential 100 with the cover 104 removed to illustrate the inertial compensation assembly 150 that provides inertial compensation tuning. As discussed above, the inertial compensation assembly includes the flywheel plate 118, the armature plate 116 and the inertial coupling assemblies 155. The inertial coupling assemblies 155 in this embodiment includes planetary gear trains. The planetary gear trains include the pivot gears 120 that are pivotally coupled to pivot post 146. The pivot post 146 may be fastened to one of the ring gear 128 and the clutch cam housing 126. As illustrated the pivot gear teeth 120a of each pivot gear 120 engage the flywheel plate teeth 117 of the flywheel plate 118 and the armature plate teeth 113 of the armature plate 116 to form the parallel axis involute planetary gear trains in this example embodiment. The use of gear trains in embodiments provides advantages over systems that may incorporate a plate slot/pivot arrangement, since a plate slot/pivot arrangement may be prone to binding where a system with planetary gear trains is not prone to binding.

In embodiments, frictional drag to ground of the flywheel plate 118 via coil 112 (in an embodiment that includes BDM functions with a BDM coil 112) causes a rotational relative motion between the roller cage 130 and the clutch cam housing 126. As the frictional drag retards flywheel plate 118, armature plate 116 advances the roller cage 130. This allows the output or side hubs 124 and 136 to "overrun" while not "under-run," which may be caused by engine power engagement.

The inertia associated with the flywheel plate 118 will have the opposite rotational reaction torque direction on the roller cage 130 due to the gear trains. Therefore, the flywheel plate 118 inertia and/or (3×) gear train can be tuned to reduce or eliminate the inertia effects of accelerating clutch cam housing 126 rotational speeds. As discussed above, the accelerations may be caused by vehicle acceleration/deceleration, sudden braking, sudden changes in traction, road irregularities, bumps, jumps, u-joint phasing, etc.

The inertial compensation assembly serves the purpose of counteracting the inertia of the roller/roller cage/armature plate assembly (132, 130, 116) such that unintended side hub/clutch cam housing (124, 136 and 126) engagements are prevented. This mechanism functions via the external flywheel plate 118 operationally coupled to the armature plate 116 through the inertial coupling assemblies 155 which are gear trains in this example. A sudden deceleration of an output causes both the flywheel plate 118 and the roller/roller cage/armature plate assembly (132, 130, 116) to accelerate in the forward direction relative to the clutch cam housing 126. Due to this acceleration, the members produce counteracting moments about the gear trains, and by extension, prevent rotation of the roller/roller cage/armature plate assembly (132, 130, 116). In this mechanism, the external flywheel rotational inertia is tuned to counteract the inertia of the roller/roller cage/armature plate assembly (132, 130, 116) and prevent unintended engagements.

Figure 9:
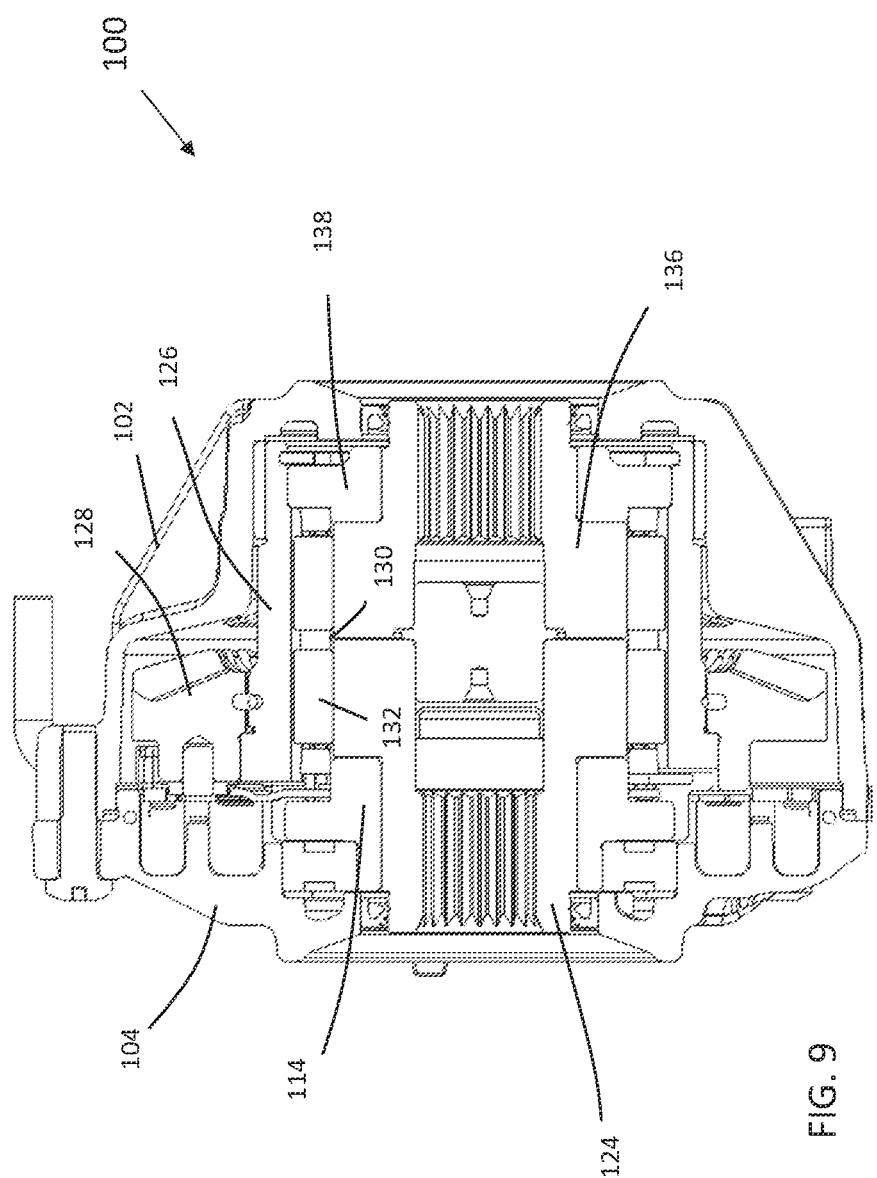
FIG. 9 is a cross-sectional front view of the assembled differential of FIG. 1.
Figure 10:
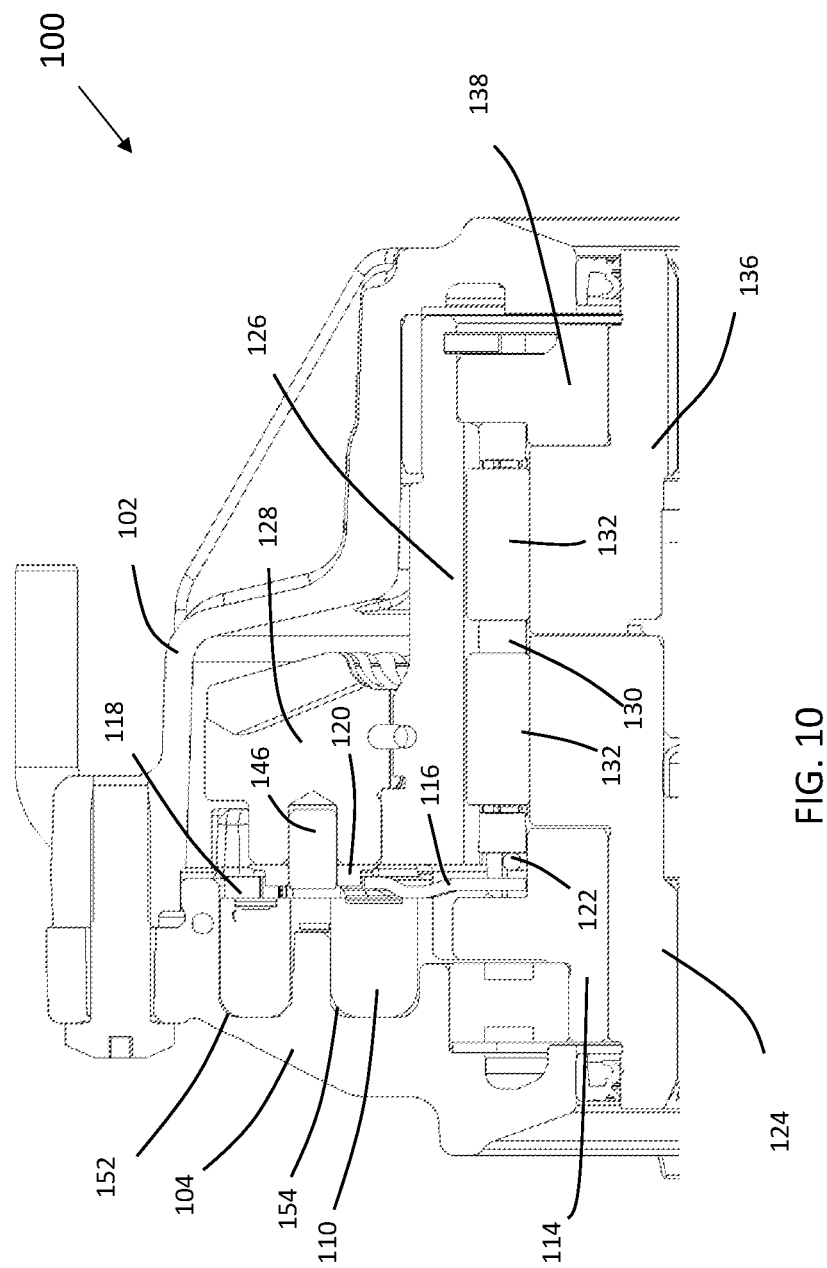
FIG. 10 is a partial cross-sectional front view of the assembled differential of FIG. 9.

FIG. 9 illustrates a cross-sectional front view of the assembled differential 100 and FIG. 10 illustrates a partial close-up cross-sectional view of the assembled differential 100. As best illustrated in FIG. 10, the cover 104 includes a first retention feature 152 and a second retention feature 154. The ORC coil 110 is received within the second retention feature 154. The first retention feature 152 may be used to hold an BDM coil 112 in an embodiment that includes a BDM coil 112. In an embodiment that does not include an BDM coil 112, an axial retention member may be housed in the first retention feature 152 as discussed below to axially retain the flywheel plate 118 to maintain engagement with the pivot gears 120.

Figure 11:
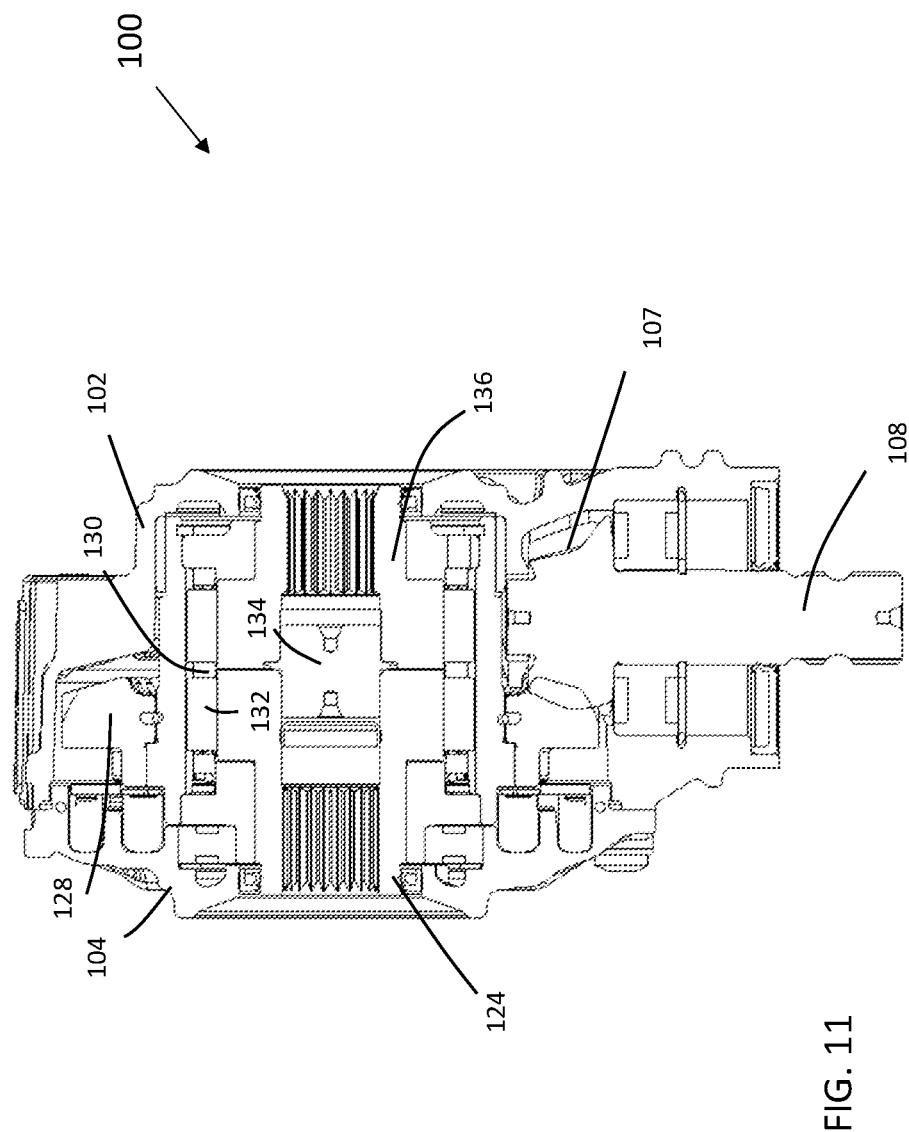
FIG. 11 is a cross-sectional top view of the assembled differential of FIG. 1.
Figure 12:
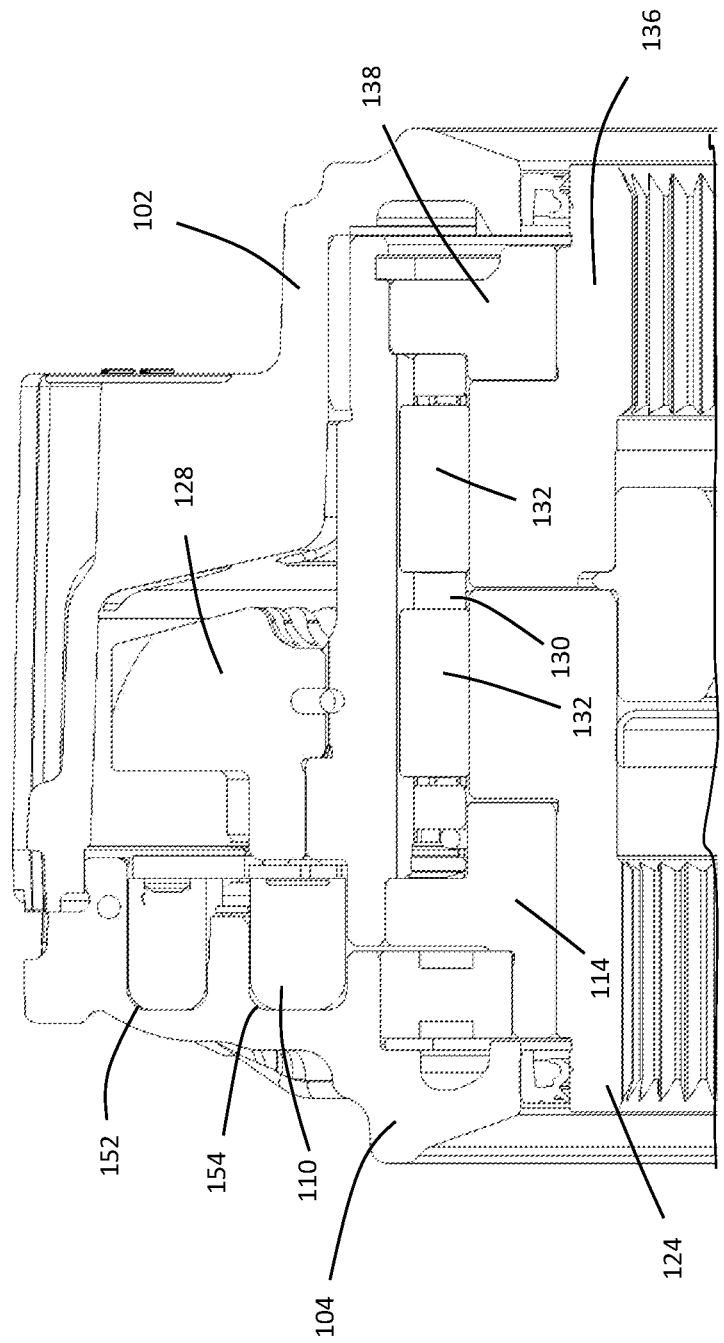
FIG. 12 is a partial cross-sectional front view of the assembled differential of FIG. 11.
Figure 13:
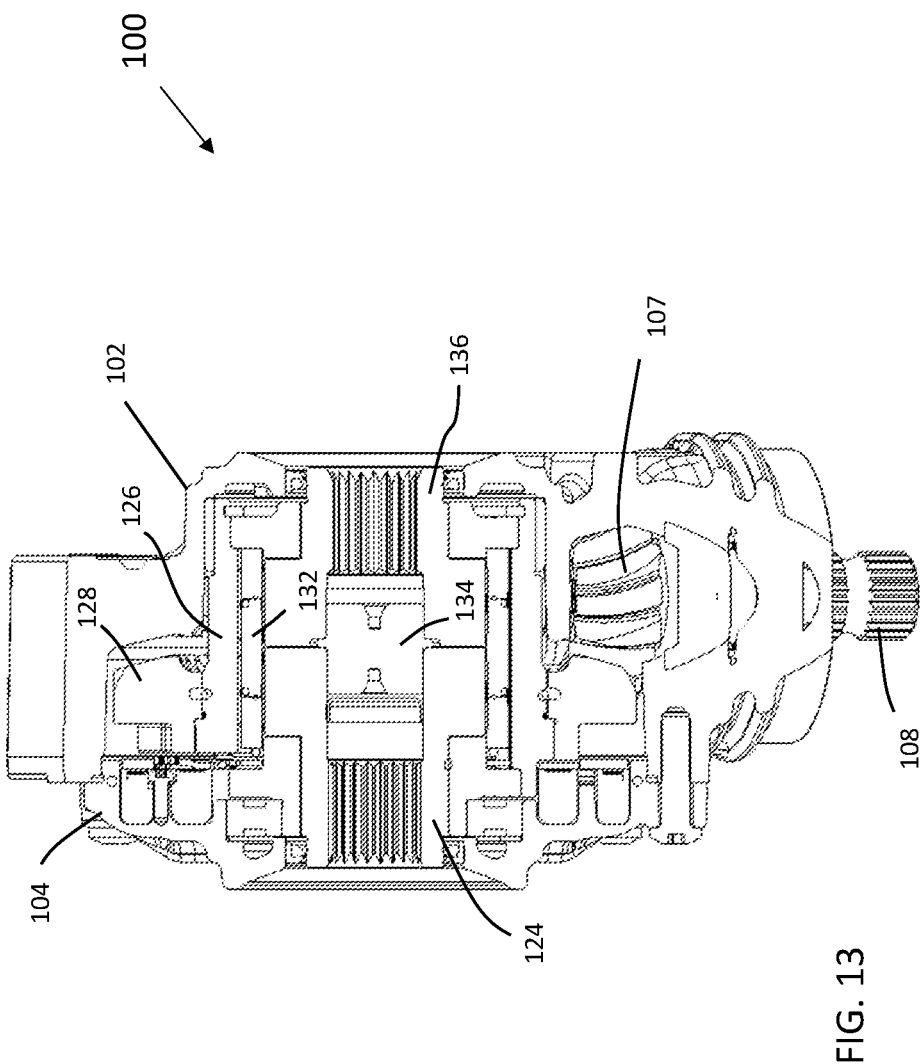
FIG. 13 is a cross-sectional bottom view of the assembled differential of FIG. 1.
Figure 14:
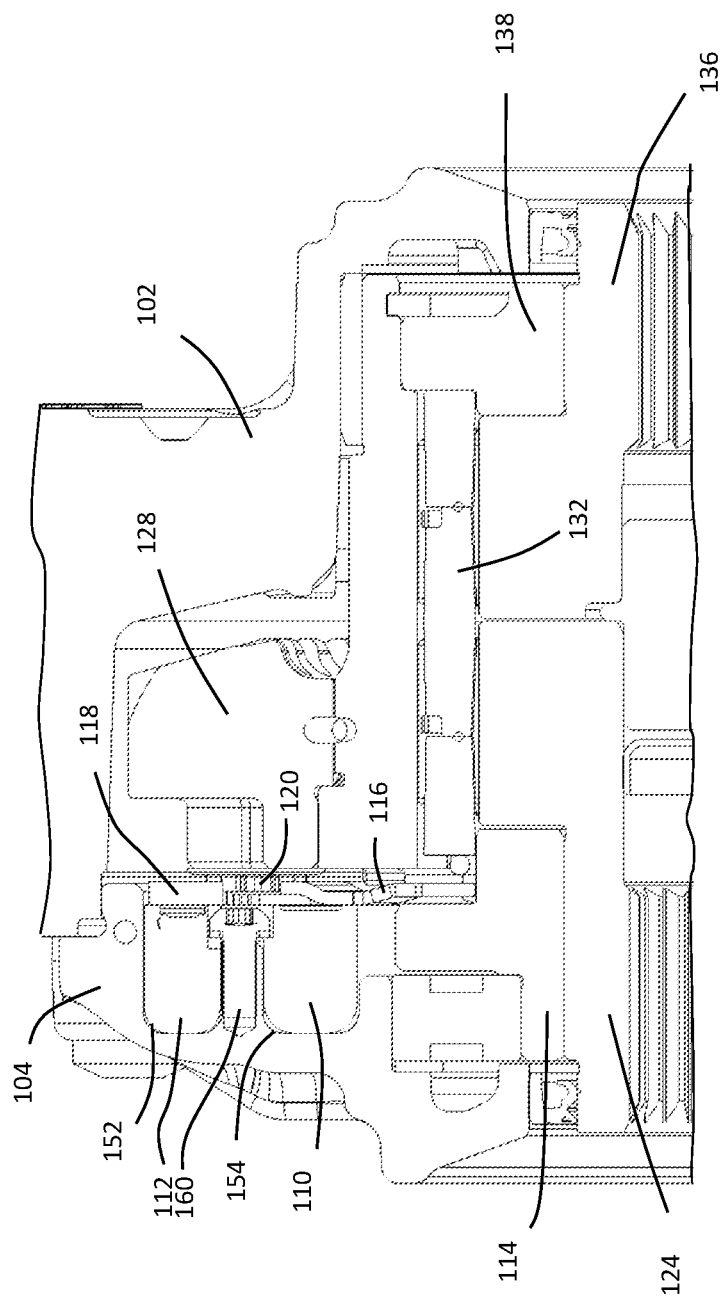
FIG. 14 is a partial cross-sectional view of the assembled differential of FIG. 13.

A cross-sectional top view of the assembled differential 100 is illustrated in FIG. 11 and a close-up partial top view is illustrated in FIG. 12. The top view of FIG. 11 illustrates the pinion gear 107 of the pinion 108 that is engaged with the ring gear 128 to transfer torque. FIG. 13 illustrates a bottom view of the assembled differential 100 and FIG. 14 and the close-up partial bottom view. As best illustrated in FIG. 14, retention fasteners 160 are used in this example to retain the coils 110 and 112 in place.

Figure 15:
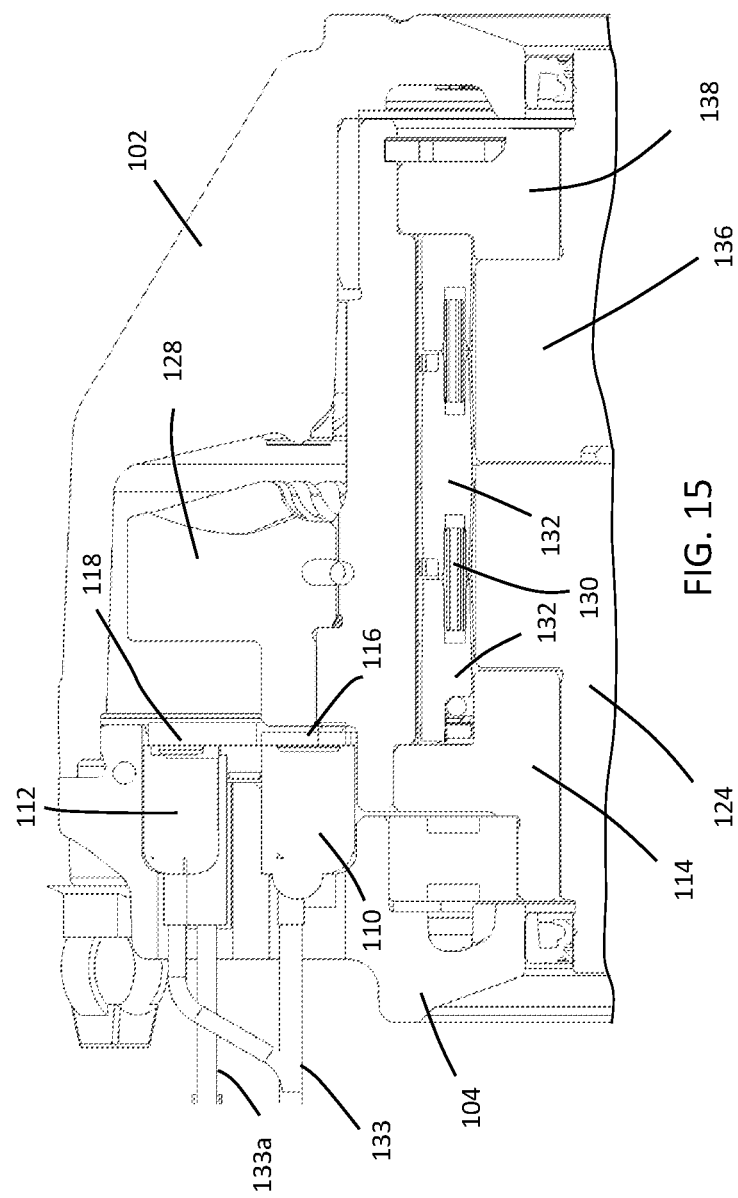
FIG. 15 is a partial cross-sectional front view of the assembled differential of FIG. 1.

FIG. 15 illustrates another partial cross-sectional view of the differential 100. This example illustrates the use of the BDM coil 112 that is in communication with a portion 133a of the activation input cable 133. As discussed above, the activation input cable 133 selectively activates the ORC coil 110 and in this example the BDM coil 112 to activate the respective ORC and BDM coils. When one of the ORC or BDM coils is electrically energized, the corresponding ORC armature plate 116 or the flywheel plate 118 is magnetically attracted to the respective coil, resulting in a frictional drag torque that overcomes the centering spring 122 torque, resulting is an ORC or BDM operating mode.

Figure 16:
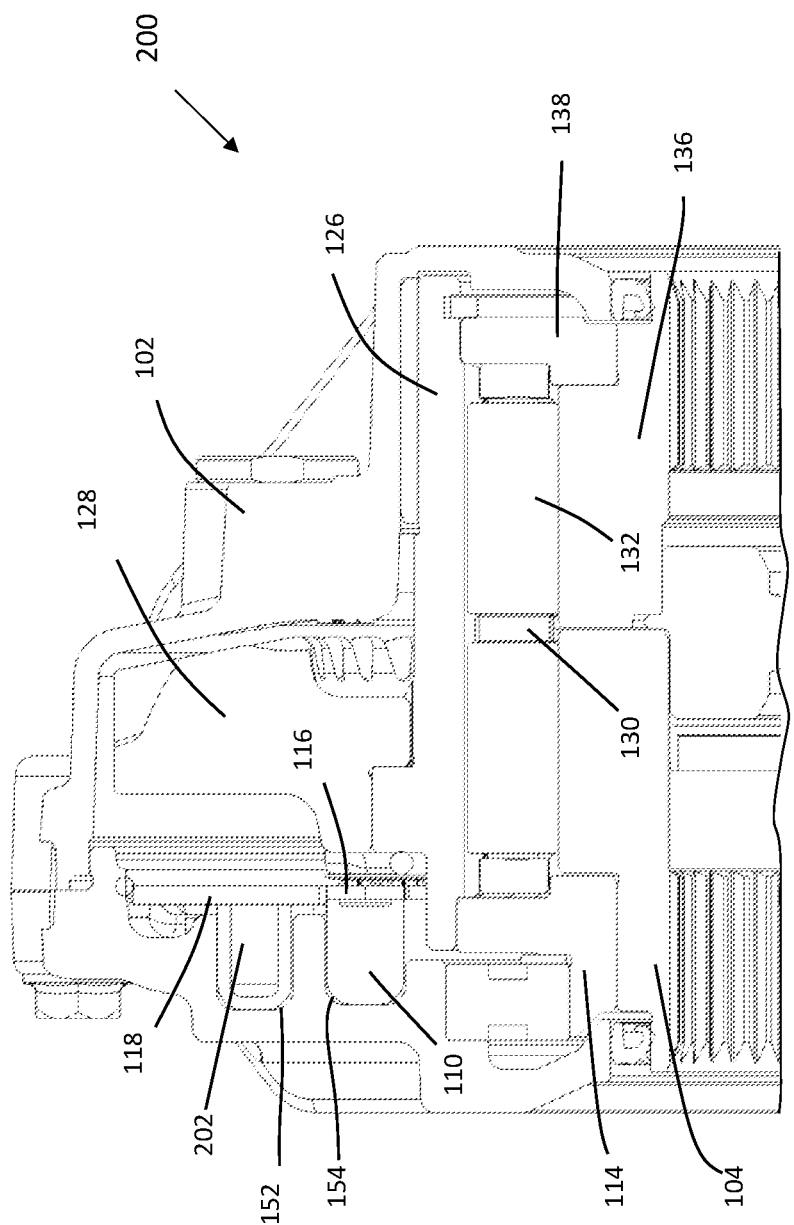
FIG. 16 is a partial side view of an assembled differential according to one exemplary embodiment.

FIG. 16 illustrates a partial view of another differential 200. This differential example does not include BDM functions and a BDM coil. As illustrated, the first retention feature 152 includes an axial retention member 202 that axially retains the flywheel plate 118 to maintain engagement with inertial coupling assemblies, such as the pivot gears discussed above. As will the other embodiments, the inertia of the flywheel plate 118 is selected to counteract inertial movement of the roller cage 130 relative to the clutch cam housing 126 to prevent unintended roller cage 130 and clutch cam housing 126 engagements. One way to select the inertia of the flywheel plate is by adjusting the mass of the flywheel plate.

Figure 17:
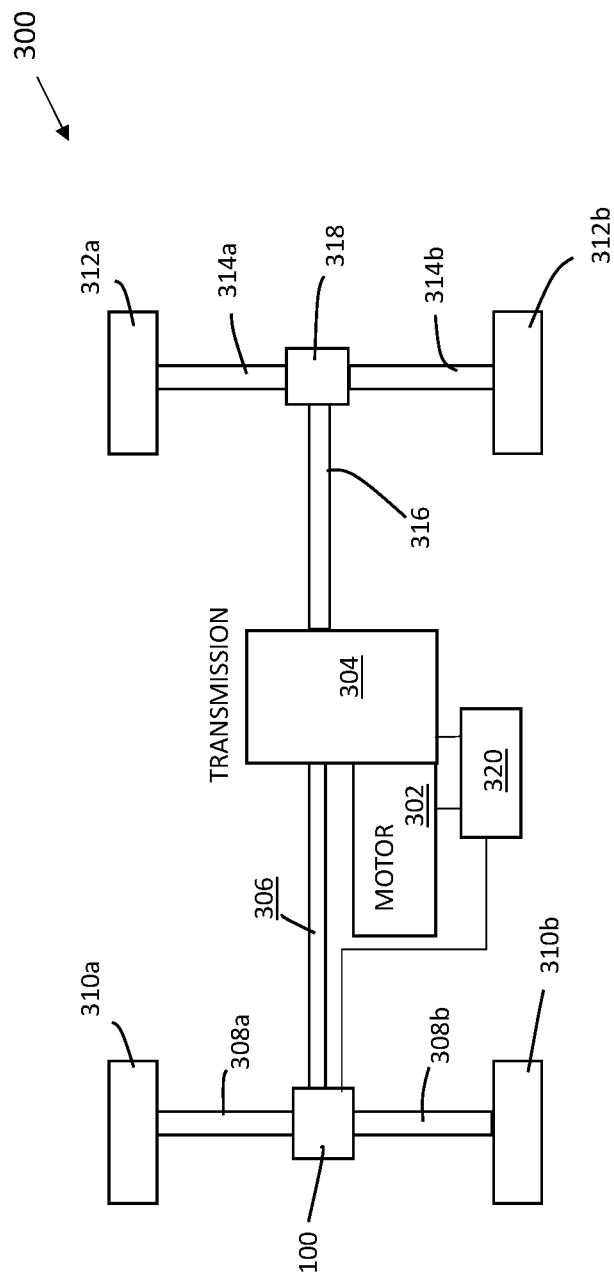
FIG. 17 is a block diagram of a vehicle that includes a differential having an overrunning clutch with inertial compensation tuning according to one exemplary embodiment In accordance with common practice, the various described features are not drawn to scale but are drawn to emphasize specific features relevant to the present invention. Reference characters denote like elements throughout Figures and text.

FIG. 17 illustrates a block diagram of a vehicle 300 of an example embodiment that includes a differential 100 with an overrunning clutch with inertial compensation tuning as discussed above. The vehicle 300 is illustrated as including a motor 302. Then motor may be an internal combustion engine (ICE), electric motor or any type of motor that provides engine torque. The motor is in operational communication with a transmission 304. The transmission may include in an example embodiment a continuously variable transmission and/or other gearing. Further in an example (not shown) the transmission 304 may be part of a transaxle.

In the example embodiment vehicle of FIG. 17, torque is coupled between the transmission 304 and the front differential via front drive shaft 306 (or front prop shaft). Further torque is coupled between front wheels 310a and 310b via associated front half shafts 308a and 308b. Torque is coupled between the transmission 304 and a rear differential 318 via rear drive shaft 316 (or rear prop shaft). Further torque is coupled between rear wheels 312a and 312b via associated rear half shafts 314a and 314b.

A controller 320, which may be part of an engine controller or transmission controller, is in communication with the ORC coil 110 and the BDM coil 112 (if included) via the activation input cable 133 discussed above. The controller is configured to activate the ORC coil(s) based on sensed conditions. Typically, the ORC coil is activated by a user selectable switch. If equipped with a BDM coil, when an BDM mode is selected, the BDM coil is activated until the vehicle throttle is at zero and the vehicle is below a predetermined speed. If the BDM coil is activated, the ORC coil is deactivated. Also, if the ORC coil is activated, the BDM coil is deactivated.

Example Embodiments

Example 1 is a differential having an overrunning clutch (ORC), the differential includes a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally engaged with the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engaging a first set of the plurality of rollers. The first hub configured to be in operational communication with a first half shaft. The second hub is at least in part received within a second portion of the roller cage. A portion of the second hub engages a second set of the plurality of rollers. The second hub configured to be in operational communication with a second half shaft. The inertial compensation assembly is configured to counteract inertial movement of the roller cage relative to the clutch cam housing to prevent unintended roller cage and clutch cam housing engagements.

Example 2 includes the differential of Example 1, wherein the inertial compensation assembly includes a flywheel plate, an armature plate and an inertial coupling assembly. The flywheel plate is positioned within a housing of the differential. The armature plate is operationally coupled to the roller cage. The inertial coupling assembly inertially couples the flywheel plate to the armature plate.

Example 3 includes the differential of Example 2, wherein the inertial coupling assembly further includes the flywheel plate having an inner edge surface. The inner edge surface including spaced flywheel plate teeth defining flywheel involute spur sector gears. The armature plate having an outer edge surface. The outer edge surface including spaced armature plate teeth that define armature involute spur sector gears. A pivot gear for each flywheel involute spur section gear and associated armature involute spur sector gear is also included. Each pivot gear includes pivot gear teeth configured to engage flywheel plate teeth and armature plate teeth of associated flywheel involute spur sector gear and armature involute spur sector gear to form gear trains.

Example 4 includes the differential of Example 3, wherein the inner edge surface of the flywheel plate has spaced interior cutout sections. The interior cutout sections provide windows to the flywheel plate teeth within each interior cutout section.

Example 5 includes the differential of any of the Examples 3-4, wherein the outer edge surface of the armature plate includes a plurality of spaced outer cutout sections. The outer cutout sections providing windows to the armature plate teeth.

Example 6 includes the differential of any of the Examples 3-5, wherein each pivot gear includes an axial retention feature and a central opening. The pivot gear teeth extending out from the axial retention feature around the central opening.

Example 7 includes the differential of any of the Examples 3-6, wherein each pivot gear is rotationally coupled to one of the ring gear and the clutch cam housing.

Example 8 includes the differential of any of the Examples 3-7, further including an ORC coil configured to be selectively activated to attract the armature plate causing a frictional drag torque on the armature plate to overcome a centering force of the cage centering spring resulting in an ORC operating mode.

Example 9 includes the differential of any of the Examples 3-8, further including a back-drive mode control (BDM) coil configured to be selectively activated to attract the armature flywheel plate causing a frictional drag torque on the flywheel plate to overcome a centering force of the cage centering spring resulting in a BDM operating mode.

Example 10 includes the differential of any of the Examples 3-8, further including an axial retention member positioned to axially retain the flywheel plate to maintain an engagement with the inertial coupling assembly.

Example 11 is a differential having an overrunning clutch (ORC), the differential includes a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear operationally engaged with the pinion. The clutch cam housing operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally engaged with the roller cage. The cage centering spring is engaged with roller cage and clutch cam housing and is configured to center each of the plurality of the rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The inertial compensation assembly includes planetary gear trains configured to counteract inertial movement of the roller cage relative to the clutch cam housing to prevent unintended roller cage and clutch cam housing engagements.

Example 12 includes the differential of Example 11, further including a flywheel plate and an armature plate. The flywheel plate is received within a housing of the differential. The armature plate is operationally coupled to the roller cage. The planetary gear trains inertially coupling the flywheel plate to the armature plate.

Example 13 includes the differential of Example 12 wherein the planetary gear trains further include the flywheel plate having an inner edge surface. The inner edge surface includes spaced flywheel plate teeth that define flywheel involute spur sector gears. The armature plate has an outer edge surface. The outer edge surface includes spaced armature plate teeth that define armature involute spur sector gears. A pivot gear for each flywheel involute spur section gear and associated armature involute spur sector gear is included. Each pivot gear includes pivot gear teeth that are configured to engage flywheel plate teeth and armature plate teeth of associated flywheel involute spur sector gear and armature involute spur sector gear.

Example 14 includes the differential of Example 13, further wherein the inner edge surface of the flywheel plate has a plurality of spaced interior cutout sections. The interior cutout sections provide windows to the flywheel plate teeth. The outer edge surface of the armature plate has a plurality of spaced outer cutout sections. The outer cutout sections providing windows to the armature plate teeth.

Example 15 includes the differential of any of the Examples 13-14, wherein each pivot gear includes an axial retention feature and a central opening, the pivot gear teeth extending out from the axial retention feature around the central opening.

Example 16 includes the differential of any of the Examples 13-15, wherein each pivot gear is rotationally coupled to one of the ring gear and clutch cam housing.

Example 17 includes a vehicle, the vehicle including a plurality of wheels, a motor to generate engine torque, a transmission in operational communication with the motor and the wheels and differential. The differential has an overrunning clutch (ORC). The differential is positioned between at least one wheel and the transmission. The differential including a pinion, a ring gear, a clutch cam housing, a roller cage, a plurality of rollers, a cage centering spring, a first and second hub and an inertial compensation assembly. The pinion is configured to be in operational communication with a transmission of a vehicle. The ring gear is operationally engaged with the pinion. The clutch cam housing is operationally engaged with the ring gear. The clutch cam housing includes a central passage. An interior surface that defines the central passage of the clutch cam housing includes a plurality of cam roller features. The roller cage is received within the central passage of the clutch cam housing. The plurality of rollers are rotationally coupled to the roller cage. The cage centering spring is engaged with roller cage and clutch cam housing and is configured to center each of the plurality of rollers within an associated cam roller feature in the interior surface of the clutch cam housing. The first hub is at least in part received within a first portion of the roller cage. A portion of the first hub engages a first set of the plurality of rollers. The first hub is configured to be in operational communication with a first half shaft. The second hub is at least in part received within a second portion of the roller cage. A portion of the second hub engages a second set of the plurality of rollers. The second hub is configured to be in operational communication with a second half shaft. The inertial compensation assembly is configured to counteract inertial movement of the roller cage in relation to the clutch cam housing to prevent unintended roller cage and clutch cam housing engagements.

Example 18 includes the vehicle of Example 17, wherein the inertial compensation assembly further includes a flywheel plate, an armature plate and pivot gears. The flywheel plate is frictionally coupled to a housing of the differential. The flywheel plate has an inner edge surface. The inner edge surface includes spaced flywheel plate teeth defining flywheel involute spur sector gears. The armature plate is operationally coupled to the roller cage. The armature plate has an outer edge surface. The outer edge surface includes spaced armature plate teeth that define armature involute spur sector gears. A pivot gear is used for each flywheel involute spur section gear and associated armature involute spur sector gear. Each pivot gear includes pivot gear teeth is configured to engage flywheel plate teeth and armature plate teeth of associated flywheel involute spur sector gear and armature involute spur sector gear.

Example 19 includes the vehicle of any of the Examples 17-18, further wherein the inner edge surface of the flywheel plate has spaced interior cutout sections. The interior cutout sections providing windows to the flywheel plate teeth within each interior cutout section. The outer edge surface of the armature plate includes a plurality of spaced outer cutout section. The outer cutout sections providing windows to the armature plate teeth.

Example 20 includes the vehicle of any of the Examples 17-19, wherein each pivot gear includes an axial retention feature and a central opening. The pivot gear teeth extending out from the axial retention feature around the central opening.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A differential having an overrunning clutch (ORC), the differential comprising:
   a pinion configured to be in operational communication with a transmission of a vehicle;
   a ring gear operationally engaged with the pinion;
   a clutch cam housing operationally engaged with the ring gear, the clutch cam housing including a central passage, an interior surface that defines the central passage of the clutch cam housing including a plurality of cam roller features;
   a roller cage received within the central passage of the clutch cam housing;
   a plurality of rollers rotationally engaged with the roller cage;
   a cage centering spring engaged with roller cage and clutch cam housing configured to center each of the plurality of the rollers within an associated cam roller feature in the interior surface of the clutch cam housing;
   a first hub at least in part received within a first portion of the roller cage, a portion of the first hub engaging a first set of the plurality of rollers, the first hub configured to be in operational communication with a first half shaft;
   a second hub at least in part received within a second portion of the roller cage, a portion of the second hub engaging a second set of the plurality of rollers, the second hub configured to be in operational communication with a second half shaft; and
   an inertial compensation assembly configured to counteract inertial movement of the roller cage relative to the clutch cam housing to prevent unintended roller cage and clutch cam housing engagements.

2. The differential of claim 1, wherein the inertial compensation assembly comprising:
   a flywheel plate positioned within a housing of the differential;
   an armature plate operationally coupled to the roller cage; and
   an inertial coupling assembly inertially coupling the flywheel plate to the armature plate.

3. The differential of claim 2, wherein the inertial coupling assembly further comprises:
   the flywheel plate having an inner edge surface, the inner edge surface including spaced flywheel plate teeth defining flywheel involute spur sector gears;
   the armature plate having an outer edge surface, the outer edge surface including spaced armature plate teeth that define armature involute spur sector gears; and
   a pivot gear for each flywheel involute spur section gear and associated armature involute spur sector gear, each pivot gear including pivot gear teeth configured to engage flywheel plate teeth and armature plate teeth of associated flywheel involute spur sector gear and armature involute spur sector gear to form gear trains.

4. The differential of claim 3, wherein the inner edge surface of the flywheel plate having spaced interior cutout sections, the interior cutout sections providing windows to the flywheel plate teeth within each interior cutout section.

5. The differential of claim 3, wherein the outer edge surface of the armature plate includes a plurality of spaced outer cutout sections, the outer cutout sections providing windows to the armature plate teeth.

6. The differential of claim 3, wherein each pivot gear includes an axial retention feature and a central opening, the pivot gear teeth extending out from the axial retention feature around the central opening.

7. The differential of claim 3, wherein each pivot gear is rotationally coupled to one of the ring gear and the clutch cam housing.

8. The differential of claim 3, further comprising:
   an ORC coil configured to be selectively activated to attract the armature plate causing a frictional drag torque on the armature plate to overcome a centering force of the cage centering spring resulting in an ORC operating mode.

9. The differential of claim 3, further comprising:
   a back-drive mode control (BDM) coil configured to be selectively activated to attract the flywheel plate causing a frictional drag torque on the flywheel plate to overcome a centering force of the cage centering spring resulting in a BDM operating mode.

10. The differential of claim 3, further comprising:
    an axial retention member positioned to axially retain the flywheel plate to maintain an engagement with the inertial coupling assembly.

11. A differential having an overrunning clutch (ORC), the differential comprising:
    a pinion configured to be in operational communication with a transmission of a vehicle;
    a ring gear operationally engaged with the pinion;
    a clutch cam housing operationally engaged with the ring gear, the clutch cam housing including a central passage, an interior surface that defines the central passage of the clutch cam housing including a plurality of cam roller features;

a roller cage received within the central passage of the clutch cam housing;

a plurality of rollers rotationally engaged with the roller cage;

a cage centering spring engaged with roller cage and clutch cam housing configured to center each of the plurality of the rollers within an associated cam roller feature in the interior surface of the clutch cam housing;

a first hub at least in part received within a first portion of the roller cage, a portion of the first hub engaging a first set of the plurality of rollers, the first hub configured to be in operational communication with a first half shaft;

a second hub at least in part received within a second portion of the roller cage, a portion of the second hub engaging a second set of the plurality of rollers, the second hub configured to be in operational communication with a second half shaft; and an inertial compensation assembly including planetary gear trains configured to counteract inertial movement of the roller cage relative to the clutch cam housing to prevent unintended roller cage and clutch cam housing engagements.

12. The differential of claim 11, further comprising:

a flywheel plate received within a housing of the differential; and an armature plate operationally coupled to the roller cage, the planetary-gear trains inertially coupling the flywheel plate to the armature plate.

13. The differential of claim 12, wherein the planetary gear trains further comprise:

the flywheel plate having an inner edge surface, the inner edge surface including spaced flywheel plate teeth defining flywheel involute spur sector gears;

the armature plate having an outer edge surface, the outer edge surface including spaced armature plate teeth that define armature involute spur sector gears; and a pivot gear for each flywheel involute spur section gear and associated armature involute spur sector gear, each pivot gear including pivot gear teeth configured to engage flywheel plate teeth and armature plate teeth of associated flywheel involute spur sector gear and armature involute spur sector gear.

14. The differential of claim 13, further wherein:

the inner edge surface of the flywheel plate having a plurality of spaced interior cutout sections, the interior cutout sections providing windows to the flywheel plate teeth; and the outer edge surface of the armature plate having a plurality of spaced outer cutout sections, the outer cutout sections providing windows to the armature plate teeth.

15. The differential of claim 13, wherein each pivot gear includes an axial retention feature and a central opening, the pivot gear teeth extending out from the axial retention feature around the central opening.

16. The differential of claim 13, wherein each pivot gear is rotationally coupled to one of the ring gear and clutch cam housing.

17. A vehicle comprising:

a plurality of wheels;

a motor to generate engine torque;

a transmission in operational communication with the motor and the wheels; and a differential having an overrunning clutch (ORC), the differential positioned between at least one wheel and the transmission; the differential including, a pinion configured to be in operational communication with a transmission of a vehicle;

a ring gear operationally engaged with the pinion;

a clutch cam housing operationally engaged with the ring gear, the clutch cam housing including a central passage, an interior surface that defines the central passage of the clutch cam housing including a plurality of cam roller features;

a roller cage received within the central passage of the clutch cam housing;

a plurality of rollers rotationally coupled to the roller cage;

a cage centering spring engaged with roller cage and clutch cam housing configured to center each of the plurality of the rollers within an associated cam roller feature in the interior surface of the clutch cam housing;

a first hub at least in part received within a first portion of the roller cage, a portion of the first hub engaging a first set of the plurality of rollers, the first hub configured to be in operational communication with a first half shaft;

a second hub at least in part received within a second portion of the roller cage, a portion of the second hub engaging a second set of the plurality of rollers, the second hub configured to be in operational communication with a second half shaft; and an inertial compensation assembly configured to counteract inertial movement of the roller cage in relation to the clutch cam housing to prevent unintended roller cage and clutch cam housing engagements.

18. The vehicle of claim 17, wherein the inertial compensation assembly further comprising:

a flywheel plate frictionally coupled to a housing of the differential, the flywheel plate having an inner edge surface, the inner edge surface including spaced flywheel plate teeth defining flywheel involute spur sector gears;

an armature plate operationally coupled to the roller cage, the armature plate having an outer edge surface, the outer edge surface including spaced armature plate teeth that define armature involute spur sector gears; and a pivot gear for each flywheel involute spur section gear and associated armature involute spur sector gear, each pivot gear including pivot gear teeth configured to engage flywheel plate teeth and armature plate teeth of associated flywheel involute spur sector gear and armature involute spur sector gear.

19. The vehicle of claim 18, further wherein:

the inner edge surface of the flywheel plate having spaced interior cutout sections, the interior cutout sections providing windows to the flywheel plate teeth within each interior cutout section; and the outer edge surface of the armature plate includes a plurality of spaced outer cutout section, the outer cutout sections providing windows to the armature plate teeth.

20. The vehicle of claim 18, wherein each pivot gear includes an axial retention feature and a central opening, the pivot gear teeth extending out from the axial retention feature around the central opening.

* * * * *

UNITED STATES PATENT AND TRADEMARK OFFICE
CERTIFICATE OF CORRECTION

| | | |
|---|---|---|
| PATENT NO. | : 11,592,094 B2 | Page 1 of 1 |
| APPLICATION NO. | : 17/399334 | |
| DATED | : February 28, 2023 | |
| INVENTOR(S) | : Hamrin et al. | |

It is certified that error appears in the above-identified patent and that said Letters Patent is hereby corrected as shown below:

On the Title Page

At Item (72), Inventor, add: "Gregory Lee Maki, Solway, MN (US)"

Signed and Sealed this
Fifth Day of November, 2024

Katherine Kelly Vidal
*Director of the United States Patent and Trademark Office*